(12) United States Patent
Jeon

(10) Patent No.: US 12,205,146 B2
(45) Date of Patent: Jan. 21, 2025

(54) ADVERTISEMENT SERVICE DEVICE AND METHOD FOR OPERATING SAME

(71) Applicant: SK Planet Co., Ltd., Seongnam-si (KR)

(72) Inventor: Jin Ho Jeon, Seongnam-si (KR)

(73) Assignee: SK Planet Co., Ltd., Seongnam-si (KR)

( * ) Notice: Subject to any disclaimer, the term of this patent is extended or adjusted under 35 U.S.C. 154(b) by 182 days.

(21) Appl. No.: 17/547,796

(22) Filed: Dec. 10, 2021

(65) Prior Publication Data
US 2022/0188868 A1    Jun. 16, 2022

(30) Foreign Application Priority Data

Dec. 11, 2020 (KR) .................. 10-2020-0173628
Mar. 3, 2021 (KR) .................. 10-2021-0028314

(51) Int. Cl.
| | | |
|---|---|---|
| *G06Q 30/0251* | (2023.01) | |
| *H04H 20/18* | (2008.01) | |
| *H04H 20/71* | (2008.01) | |
| *H04W 4/23* | (2018.01) | |
| *H04W 84/12* | (2009.01) | |

(52) U.S. Cl.
CPC ......... *G06Q 30/0267* (2013.01); *H04H 20/18* (2013.01); *H04H 20/71* (2013.01); *H04W 4/23* (2018.02); *H04W 84/12* (2013.01)

(58) Field of Classification Search
CPC .... G06Q 30/0267; H04H 20/18; H04H 20/71; H04H 60/63; H04H 60/46; H04H 2201/70; H04W 4/23; H04W 84/12; H04W 4/06; H04W 8/005

USPC ................. 705/14.64, 26.1; 370/329
See application file for complete search history.

(56) References Cited

U.S. PATENT DOCUMENTS

| | | | |
|---|---|---|---|
| 2009/0055268 A1* | 2/2009 | Knoller | H04N 21/2665 |
| | | | 705/26.1 |
| 2010/0054121 A1* | 3/2010 | Sakai | H04W 48/20 |
| | | | 370/329 |
| 2017/0220940 A1* | 8/2017 | Shaashua | G06F 16/35 |
| 2020/0104705 A1* | 4/2020 | Bhowmick | G06N 3/044 |

FOREIGN PATENT DOCUMENTS

KR    10-2020-0025926 A    3/2020

OTHER PUBLICATIONS

Xiaowel Xu, SCAN: A Structural Clustering Algorithm for Networks, 2007 (Year: 2007).*
Office Action of the corresponding KR 10-2020-0173628 mailed on Oct. 10, 2024.

* cited by examiner

*Primary Examiner* — Tarek Elchanti
(74) *Attorney, Agent, or Firm* — WTA Patents

(57) ABSTRACT

The present disclosure proposes a device for executing an advertisement service and a method for operating the same, for providing a targeted advertisement according to an advertisement execution condition determined for a terminal on the basis of scanning data obtained by scanning wireless local area networks (WLANs) (for example, Wi-Fi) in an addressable TV advertisement environment. The present disclosure also proposes a device for executing an advertisement service for providing a targeted advertisement for a combination of member terminals and visitor terminals located within a home in an addressable TV advertisement environment.

6 Claims, 8 Drawing Sheets

ADVERTISEMENT SERVICE DEVICE AND METHOD FOR OPERATING SAME

CROSS REFERENCE TO RELATED APPLICATIONS

The present application claims the benefit of priority to Korean Patent Application No. 10-2020-0173628, filed on Dec. 11, 2020, and Korean Patent Application No. 10-2021-0028314, filed on Mar. 3, 2021, in the Korean Intellectual Property Office, which are incorporated by reference herein in their entirety.

TECHNICAL FIELD

The present disclosure relates to a method for providing a targeted advertisement according to an advertisement execution condition determined for a terminal on the basis of scanning data obtained by scanning a wireless local area network (WLAN) (for example, Wi-Fi) in an addressable TV advertisement environment.

Further, the present disclosure relates to a method for providing a targeted advertisement to a combination of a member terminal located within a home and a visitor terminal in an addressable TV advertisement environment

BACKGROUND

Recently, in an Internet Protocol Television (IPTV) service environment for providing a bi-directional information service that provides several hundreds of channels using a high-speed Internet network, commercialization of addressable TV advertisements is speeding up.

An addressable TV is a subordinate concept of a programmatic TV through which TV advertisements based on data are purchased and transmitted, and refers to state-of-the-art advertising technology that can transmit targeted advertisements to homes.

In this connection, in the case of conventional TV advertisements, a broadcasting company purchases advertisements that are added to the start, end, and middle portions of a program unit, and then transmits the advertisements to TVs in all homes at the same time, and accordingly all viewers view the same advertisement at the same time.

On the contrary, the addressable TV advertisement is a scheme in which an IPTV platform service provider, rather than the broadcasting company, provides advertisements to individuals, and through analysis of various pieces of data relating to a viewing history of each home, family members, gender, age, characteristics, interests, and the like, the platform service provider may transmit a home-customized advertisement having high correlation, and also transmit a customized advertisement in a real time channel.

In such an addressable TV advertisement environment, in order to provide a targeted advertisement to a set-top box, a server side that provides the targeted advertisement needs to identify an advertisement ID corresponding to a pair of the set-top box and a terminal and, to this end, a terminal side transmits its own advertisement ID to the server side when accessing a wireless local area network (WLAN) (for example, Wi-Fi).

However, since the terminal can access not only a WLAN in the home in which the set-top box is installed but also any external WLAN, the advertisement ID may be transmitted indiscriminately. Particularly, if access to a WLAN is blocked according to a terminal configuration, an issue may arise in which the advertisement ID cannot be transmitted even when the terminal is located in the home in which the set-top box is installed.

Meanwhile, separately from the above issues regarding the advertisement ID, the targeted advertisement can be provided to an IPTV subscriber in the home in the addressable TV advertisement environment, and thus the targeted advertisement may have a higher advertisement effect than a conventional TV advertisement. If terminals identified in the home are divided into conventional member terminals and visitor terminals, and the targeted advertisement can be provided thereto, a better advertisement effect can be expected.

SUMMARY

The present disclosure is directed to addressing the above-mentioned issues by providing a targeted advertisement according to an advertisement execution condition determined for a terminal on the basis of scanning data obtained by scanning a wireless local area network (WLAN) (for example, Wi-Fi).

In addition, the present disclosure is directed to addressing the above issues by identifying a combination of a member terminal and a visitor terminal located in the home, and providing a targeted advertisement according thereto in an addressable TV advertisement environment.

In order to address the abovementioned issues, a device for executing an advertisement service according to an embodiment of the present disclosure includes: a generator configured to classify scanning data obtained by scanning wireless local area networks (WLANs) by a terminal into data for each of monitored time periods, and generate a clustering data set for each monitored time period; and a selector configured to select, based on a data change amount identified for each of the clustering data sets, a clustering data set having a smallest data change amount as a data set to be analyzed, which matches a specific place in which a set-top box is installed.

In order to address the abovementioned issues, a method for executing an advertisement service according to an embodiment of the present disclosure includes: classifying scanning data obtained by scanning WLANs by a terminal into data for each of monitored time periods, and generating a clustering data set for each monitored time period; and selecting, based on a data change amount identified for each of the clustering data sets, a clustering data set having a smallest data change amount as a data set to be analyzed, which matches a specific place in which a set-top box is installed.

In order to address the abovementioned issues, a device for executing an advertisement service according to an embodiment of the present disclosure includes: a discriminator configured to divide terminals of which locations are identified within a home into member terminals corresponding to terminals possessed by members of the home and visitor terminals corresponding to terminals possessed by visitors to the home; a determiner configured to determine a familiarity degree between the member terminal and the visitor terminal; and a provider configured to select and provide a targeted advertisement for a combination of member terminals and visitor terminals according to a result of the determination of the familiarity degree.

According to the device for executing the advertisement service and the method for operating the same according to the embodiment of the present disclosure, by determining an advertisement execution condition for a terminal on the basis of scanning data obtained by scanning WLANs (Wi-Fi) in an addressable TV advertisement environment and providing a targeted advertisement to the set-top box at a time point that matches the corresponding advertisement execution condition, it is possible to prevent the terminal from excessively using resources, since the terminal does not need to undergo a process of accessing the WLAN and performing multicasting with a set-top box to provide an advertisement ID.

In addition, according to the device for executing an advertisement service according to the embodiment of the present disclosure, by providing a targeted advertisement according to a familiarity degree determined for a combination of member terminals and visitor terminals located in the home in the addressable TV advertisement environment, it is possible to improve a targeting effect of an advertisement.

DETAILED DESCRIPTION

Figure 1:
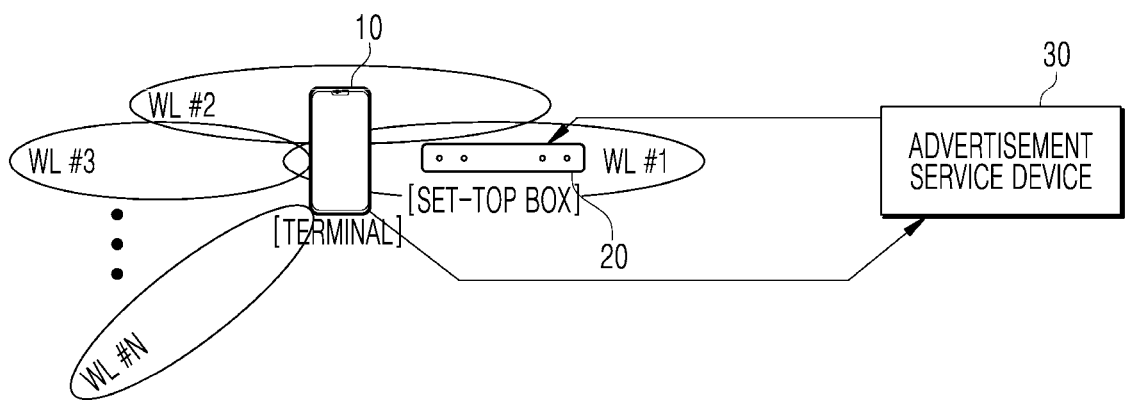
FIG. 1 illustrates an example of an addressable TV advertisement environment according to a first embodiment of the present disclosure.

It should be noted that the technical terms as used herein are merely used for describing particular embodiments, and are not intended to limit the scope of the present disclosure. Further, the technical terms in the specification should be construed as having a meaning as generally understood by those skilled in the art, unless the terms are defined as another meaning, and should not be construed as having an excessively inclusive meaning or an excessively exclusive meaning. When a technical term used in the specification is an incorrect technical term which does not accurately express the idea of the present disclosure, the technical term should be replaced with the correct technical term which can be understood by those skilled in the art. Further, the general terms used in the present disclosure should be interpreted in the context according to the dictionary definitions thereof, and should not be construed as having an excessively limited meaning.

In addition, singular expressions used in the specification include the plural expressions as long as they are clearly distinguished in the context. In the specification, the terms "comprise" or "include" should not be construed as necessarily including all of various elements or various steps disclosed herein, and it should be understood that some of the elements or steps may not be included, or additional elements or steps may be further included.

In addition, although terms including ordinal numbers such as first, second, and the like may be used to describe various elements, the elements should not be restricted by these terms. The terms are used merely for the purpose to distinguish an element from the other elements. For example, a first element may be termed a second element, and similarly, a second element may be termed a first element, without departing from the scope of the present disclosure.

Hereinafter, embodiments of the present disclosure will be described in detail with reference to the accompanying drawings, equal or similar elements are assigned an equal reference numeral, and an overlapping description thereof will be omitted.

Further, in the following description of the technology of the present disclosure, a detailed description of known technologies incorporated herein will be omitted when it may make the subject matter of the present disclosure unclear. Further, it should be noted that the accompanying drawings are intended only for easy understanding of the technical idea of the present disclosure, and the technical idea should not be construed as being limited by the accompanying drawings.

Hereinafter, a first embodiment of the present disclosure will be described with reference to the accompanying drawings.

In the first embodiment of the present disclosure, an addressable TV advertisement technology, which is state-of-the-art advertising technology capable of sending targeted advertisements to homes, is described.

Recently, in an Internet Protocol Television (IPTV) service environment for providing a bi-directional information service that provides several hundreds of channels using a high-speed Internet network, commercialization of addressable TV advertisements is speeding up.

An addressable TV is a subordinate concept of a programmatic TV capable of performing TV advertisement purchase and transmission based on data, and refers to state-of-the-art advertisement technology which can transmit targeted advertisements to homes.

In this connection, conventional TV advertisements have kept to a scheme in which an advertiser produces advertisements and makes contracts in units of broadcasting programs through a program producer or a broadcasting business operator.

In other words, in the conventional TV advertisement environment, a broadcasting company purchases advertisements added to the start, end, and middle portions of a program unit, and then transmits the advertisements to TVs in the homes at the same time, and accordingly all viewers view the same advertisement at the same time.

This is a scheme of exposing the advertisement to many and unspecified persons, which cannot be accurately targeted, and thus has disadvantages in that large budget loss is generated, it is difficult to accurately measure the performance of an advertisement, and a ratio of redundancy may appear.

On the contrary, the addressable TV advertisement is a scheme in which an IPTV platform service provider, rather than the broadcasting company, provides advertisements to individuals, and through analysis of various pieces of data relating to a viewing history of each home, family members, gender, age, characteristics, interests, and the like, the platform service provider may transmit a home-customized advertisement having high correlation, and also transmit a customized advertisement in a real time channel.

Meanwhile, in the addressable TV advertisement environment, in order to provide a targeted advertisement to a set-top box, a server side that provides the targeted advertisement needs to identify an advertisement ID corresponding to a pair of the set-top box and a terminal and, to this end, a terminal side transmits its own advertisement ID to the server side when accessing a wireless local area network (WLAN) (for example, Wi-Fi).

However, since the terminal can access not only a WLAN in the home in which the set-top box is installed but also an external WLAN, the advertisement ID may be transmitted indiscriminately.

Particularly, if access to a WLAN is blocked according to a terminal configuration, an issue may arise in which the advertisement ID cannot be transmitted may occur even when the terminal is located in the home in which the set-top box is installed.

Accordingly, the first embodiment of the present disclosure proposes a new method for providing a targeted advertisement in an addressable TV advertisement environment.

In this connection, FIG. 1 illustrates an example of the addressable TV advertisement environment according to the first embodiment of the present disclosure.

As illustrated in FIG. 1, the addressable TV advertisement environment according to the first embodiment of the present disclosure may include an advertisement service device 30 for providing a targeted advertisement to a set-top box 20 of a user having a terminal 10 at a time point that matches an advertisement execution condition determined for the terminal 10.

The terminal 10 is a mobile device for generating scanning data obtained by scanning a WLAN at the current location thereof, and transferring the scanning data to the advertisement service device 30.

The terminal 10 may be, for example, a smart phone, a portable terminal, a mobile terminal, a personal digital assistant (PDA), a portable multimedia player (PMP), a telematics terminal, a navigation terminal, a personal computer, a notebook computer, a slate PC, a tablet PC, an ultrabook, a wearable device, and the like, but is not limited thereto, and may include any device capable of scanning a WLAN through a GPS, Wi-Fi, Bluetooth, BLE, a sensor, Near Field Communication (NFC), and the like.

The set-top box 20 is a relay device installed in a specific place (for example, within a home) to support an Internet Protocol Television (IPTV) service to a user having the terminal 10, and may provide not only reception of various items of content but also a bi-directional service supported by the IPTV service through a router (not shown).

The advertisement service device 30 is a device for determining an advertisement execution condition for the terminal 10 on the basis of scanning data obtained by scanning neighboring WLANs WL #1, WL #2, . . . WL #N by the terminal 10, and providing a targeted advertisement device to the set-top box 20 at a time point that matches the determined advertisement execution condition, and may be implemented, for example, in the form of a server.

When the advertisement service device 30 is implemented in the form of a server, the advertisement service device may be implemented in the form of, for example, a web server, a database server, a proxy server, or the like, and may be implemented as a computerized system through installation of one or more of various pieces of software that allow a network load distribution mechanism or the service device to operate over the Internet or another network.

At this time, the network may be an http network, a private line, an intranet, or any other network, and a connection between elements within an advertisement providing system according to the first embodiment of the present disclosure may be made through a security network to prevent data from being compromised by any hacker or other third party.

In the addressable TV advertisement environment according to the first embodiment of the present disclosure, the terminal 10 may determine the advertisement execution condition for the terminal 10 on the basis of the scanning data obtained by scanning the WLANs WL #1, WL #2, . . . WL #N, and provide the targeted advertisement to the set-top box 20 at the time point that matches the advertisement execution condition through the above-described condition, and hereinafter, the configuration of the advertisement service device 30 for implementing the same will be described in more detail.

Figure 2:
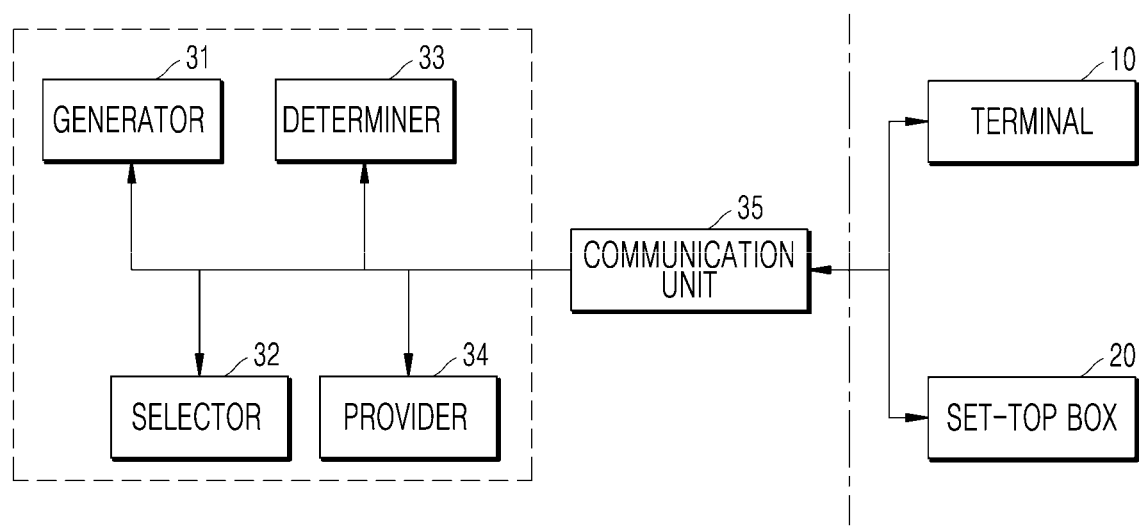
FIG. 2 is a block diagram schematically illustrating an advertisement service device according to the first embodiment of the present disclosure.

In this connection, FIG. 2 schematically illustrates the configuration of the advertisement service device 30 according to the first embodiment of the present disclosure.

As illustrated in FIG. 2, the advertisement service device 30 according to the first embodiment of the present disclosure may have a configuration including a generator 31 for generating a clustering data set and a selector 21 for selecting a data set to be analyzed.

In addition to the above-described elements, the advertisement service device 30 according to the first embodiment of the present disclosure may have a configuration further including a determiner 33 for determining an advertisement execution condition and a provider 34 for providing a targeted advertisement.

All or at least some of the elements of the advertisement service device 30, including the generator 31, the selector 32, the determiner 33, and the provider 34, may be implemented in the form of a software module executed by a processor, in the form of a hardware module, or in the form of a combination of a software module and a hardware module.

Meanwhile, in addition to the above-described elements, the advertisement service device 30 according to the first embodiment of the present disclosure may have a configuration further including a communication unit 35, which is a communication module for performing actual communication with the terminal 10.

For reference, the communication unit 35 is an element that corresponds to a communication unit 3310 described with reference to FIG. 3 below, and a detailed description thereof will be made below.

As a result, the advertisement service device 30 according to the first embodiment of the present disclosure may determine the advertisement execution condition for the terminal 10 on the basis of the scanning data obtained by scanning the WLANs by the terminal 10, and may provide the targeted advertisement to the set-top box 20 at the time point that matches the advertisement execution condition through the above-described condition, and hereinafter, a detailed description of each element of the advertisement device 30 for implementing the same will described.

The generator 31 performs a function of generating a clustering data set.

More specifically, the generator 31 collects scanning data obtained by scanning the WLANs by the terminal 10, classifies the collected scanning data into data for each of predefined monitored time periods, and generates a clustering data set for each monitored time period.

The monitored time period is a time period on a specific day (for example, the weekend or a holiday) during which it is expected that the user of the terminal 10 is highly likely to be located in a specific place (for example, at home) in which the set-top box 20 is installed, and may be divided such that the overall time of the specific day is divided into time period units (day time/night time).

Meanwhile, in this connection, the terminal 10 scans neighboring WLANs according to a preset scanning period or a separate indication, generates scanning data at each scanning time point, and transmits the generated scanning data in real time to the advertisement service device 30 at every time point at which the scanning data is generated, or collectively transmits the generated scanning data to the advertisement service device 30 at a time point at which a predetermined amount of scanning data has been accumulated.

The scanning data may include a list of scanned WLANs, and items of the list may include, for example, a Basic Service Set Identifier (BSSID) for identifying a Basic Service Set (BSS), which is a basic service area of the WLAN, a Service Set Identifier (SSID), which is identification information for access between the terminal and an AP, a Received Signal Strength Indication (RSSI) from each WLAN, and the like.

The selector 32 performs a function of selecting a data set to be analyzed.

More specifically, when clustering data sets in each monitored time period have been generated, the selector 32 selects a data set to be analyzed, which matches a specific place (for example, the home) in which the set-top box 20 is installed, from among the clustering data sets in each monitored time period, on the basis of a data change amount identified for each of the clustering data sets.

At this time, the selector 32 may select the clustering data set that is identified to have the smallest data change amount as the data set to be analyzed, among the clustering data sets in each monitored time period.

To this end, the selector 32 may compare WLAN lists within the scanning data classified for each of the clustering data sets according to the scanning data, and identify a mismatch degree between the WLAN lists on the basis of the result of the comparison as the data change amount in the clustering data set.

The smallest data change amount in the clustering data set may mean that movement of the terminal 10 is minimal on a specific day (for example, the weekend or a holiday) on which it is expected that the user of the terminal 10 is highly likely to be located at a specific place (for example, the home) in which the set-top box 20 is installed, from which it may be construed that the user of the terminal 10 is most likely to be located at the specific place (for example, the home) in which the set-top box 20 is installed.

Accordingly, the selector 32 may select the clustering data set identified to have the smallest data change amount among the clustering data sets in each monitored time period as the data to be analyzed, which matches the specific place (for example, the home) in which the set-top box 20 is installed.

The determiner 33 performs a function of determining an advertisement execution condition for the terminal 10.

More specifically, when the data to be analyzed, which matches the specific place (for example, the home) in which the set-top box 20 is installed, is selected, the determiner 33 analyzes network information in the monitored time period into which the corresponding data set has been classified from the selected data set to be analyzed, and determines the analyzed network information as the advertisement execution condition of the terminal 10 for performing advertisement execution.

At this time, the network information analyzed from the data to be analyzed may include a BSSID, which is identification information of a basic service area (BSS) having the largest scanning frequency in the monitored time period into which the data set to be analyzed has been classified, and the largest sum of received signal strengths (RSSIs) of each station.

The basic service area (BSS) having the largest scanning frequency in the monitored time period into which the data set to be analyzed has been classified, and the largest sum of received signal strengths (RSSIs) of each station, may be understood as a representative basic service area that can most exactly specify the specific place (for example, the home) in which the set-top box 20 is installed among a plurality of basic service areas that can be identified within the specific place (for example, the home) in which the set-top box 20 is installed.

To this end, the determiner 33 arranges WLANs included in the scanning data within the data set to be analyzed in descending order based on the received signal strength (RSSI), and applies a term frequency-inverse document frequency (TF-IDF) algorithm to identify a frequency of each BSSID from a list of the WLANs arranged in descending order.

Further, the determiner 33 classifies the result that has passed through the above process into separate rows, and determines the BSSID of the basic service area (BSS) analyzed to have the largest scanning frequency and the largest sum of received signal strengths (RSSIs) of stations as the advertisement execution condition of the terminal 10 for performing advertisement execution.

Meanwhile, in the first embodiment of the present disclosure, a case in which the WLAN of the specific place (for example, the home) includes, for example, dual channels of 2.4G and 5G may be considered.

In this case, in the first embodiment of the present disclosure, through application of similarity between texts, different BSSIDs determined to have a similarity between texts of larger than or equal to a threshold value may be considered to be the same BSSIDs.

The provider 34 performs a function of providing a targeted advertisement for the terminal 10.

More specifically, when network information that matches the advertisement execution condition is identified from the terminal 10 after the advertisement execution condition for the terminal 10 is determined, the provider 34 provides the targeted advertisement for the terminal 10 to the set-top box 30.

At this time, when network information that matches the advertisement execution condition determined for the terminal 10 is identified from scanning data obtained through scanning by the terminal 10 in every preset scanning period, the provider 34 may provide the targeted advertisement for the terminal 10 to the set-top box 20 at a time point at which the corresponding network information is identified.

The identification of the network information that matches the advertisement execution condition determined for the terminal 10 from the scanning data obtained through scanning by the terminal 10 means that the terminal 10 has entered (is located at) specific place (for example, the home) in which the set-top box 20 is installed.

Accordingly, in the first embodiment of the present disclosure, the targeted advertisement for the terminal 10 is provided only when entry (placement) of the terminal 10 into the specific place (for example, the home) in which the set-top box 20 is installed is identified, and thus improvement of an advertisement effect of the targeted advertisement may be expected.

In the above description, it can be seen that, in the overall process in which the targeted advertisement for the terminal 10 is provided to the set-top box 20, the terminal 10 is only involved in some processes, that is, in generating the scanning data obtained by scanning neighboring WLANs and in providing the scanning data to the advertisement service device 30.

However, in the first embodiment of the present disclosure, the advertisement service device 30 is not limited to the above embodiment, and an embodiment in which the terminal 10 acquires the advertisement execution condition determined for the terminal 10, transmits an advertisement ID to the advertisement service device 30 at the time point at which network information that matches the advertisement execution condition is identified from its own scanning data of the terminal 10 acquiring the advertisement execution condition, and receives the targeted advertisement, can additionally be considered.

Meanwhile, it has been described above that each element of the advertisement service device 30 may be implemented in the form of a software module executed by the processor or a hardware module, or in the form of a combination of a software module and a hardware module.

As such, the software module executed by the processor, the hardware module, and the combination of the software module and the hardware module may be implemented by an actual hardware system (for example, a computer system).

Accordingly, hereinafter, a hardware system 3000, obtained by implementing the advertisement service device 30 in a hardware form according to the first embodiment of the present disclosure, is described with reference to FIG. 3.

For reference, the following description is an example of the hardware system 3000 in which each element of the advertisement service device 30 is implemented, and it should be noted that each element and the operation thereof may be different from those of an actual system.

Figure 3:
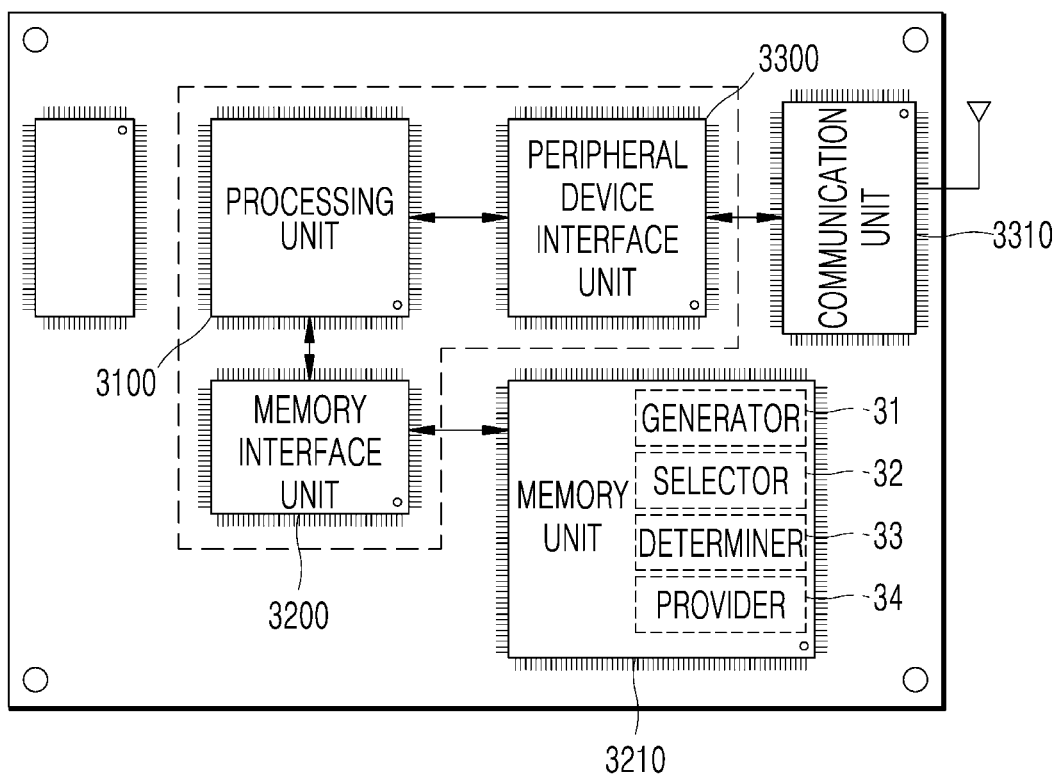
FIG. 3 illustrates an example of a hardware system for implementing the advertisement service device according to the first embodiment of the present disclosure.

As illustrated in FIG. 3, the hardware system 3000 according to the first embodiment of the present disclosure may have a configuration including a processing unit 3100, a memory interface unit 3200, and a peripheral device interface unit 3300.

The respective elements of the hardware system 3000 may be individual elements, or may be integrated into one or more integrated circuits, and may be combined by a bus system (not shown).

The bus system is an abstraction indicating one or more individual physical buses, communication lines/interfaces, and/or multi-drop or point-to-point connections connected by bridges, adaptors, and/or controllers as appropriate.

The processing unit 3100 may serve to execute various software modules stored in a memory unit 3210 by communicating with the memory unit 3210 through the memory interface unit 3200 in order to perform various functions in the hardware system.

The memory unit 3210 may store the generator 31, the selector 32, the determiner 33, and the provider 34, which are the elements of the advertisement service device 30 described with reference to FIG. 2, in the form of a software module, and may further store an operating system (OS).

The operating system (for example, an embedded operating system such as iOS, Android, Darwin, RTXC, LINUX, UNIX, OS X, WINDOWS, or VxWorks) includes various procedures, an instruction set, a software component, and/or a driver for controlling and managing general system tasks (for example, memory management, storage device control, power management, and the like), and serves to facilitate communication between various hardware modules and software modules.

For reference, the memory unit 3210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a compact disk (CD), and a digital video disc (DVD)).

The peripheral device interface unit 3300 serves to enable communication between the processing unit 3100 and peripheral devices.

The peripheral devices are to provide different functions to the hardware system 300, and may include, for example, the communication unit 3310 in the first embodiment of the present disclosure.

The communication unit 3310 serves to provide a function of communication with another device. To this end, the communication unit 1310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 3310 may include, for example, a wireless LAN (WLAN), Digital Living Network Alliance (DLNA), Wireless broadband (Wibro), World interoperability for microwave access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, and Wi-Fi Direct. Wired communication networks may include wired Local Area Network (LAN), wired Wide Area Network (WAN), Power Line Communication (PLC), USB communication, Ethernet, serial communication, and optical fiber/coaxial cable, but are not limited thereto, and may include any protocol that can provide a communication environment with another device.

As a result, through the respective elements of the advertisement service device 30 stored in the memory unit 3210 in the form of a software module in the hardware system 3000 according to the first embodiment of the present disclosure, an interface with the communication unit 3310 via the memory interface unit 3200 and the peripheral device interface unit 3300 in the form of instructions executed by the processing unit 3100 may be executed, and thus the terminal 10 may determine the advertisement execution condition for the terminal 10 on the basis of scanning data obtained by scanning WLANs, and provide the targeted advertisement to the set-top box 20 at the time point that matches the advertisement execution condition.

As described above, according to the configuration of the advertisement service device 30 according to the first embodiment of the present disclosure, by determining the advertisement execution condition for the terminal 10 on the basis of scanning data obtained by scanning the WLAN (Wi-Fi) and providing the targeted advertisement to the set-top box 20 at the time point that matches the advertisement execution condition, it is possible to prevent the terminal 10 from excessively using resources, since the terminal does not require processes of accessing the WLAN and performing multicasting with the set-top box in order to provide an advertisement ID. In this connection, in the first embodiment of the present disclosure, the targeted advertisement for the terminal 10 is provided only when entry (placement) of the terminal 10 into the specific place (for example, the home) in which the set-top box 20 is installed is identified, and thus improvement of an advertisement effect of the targeted advertisement can be expected.

Figure 4:
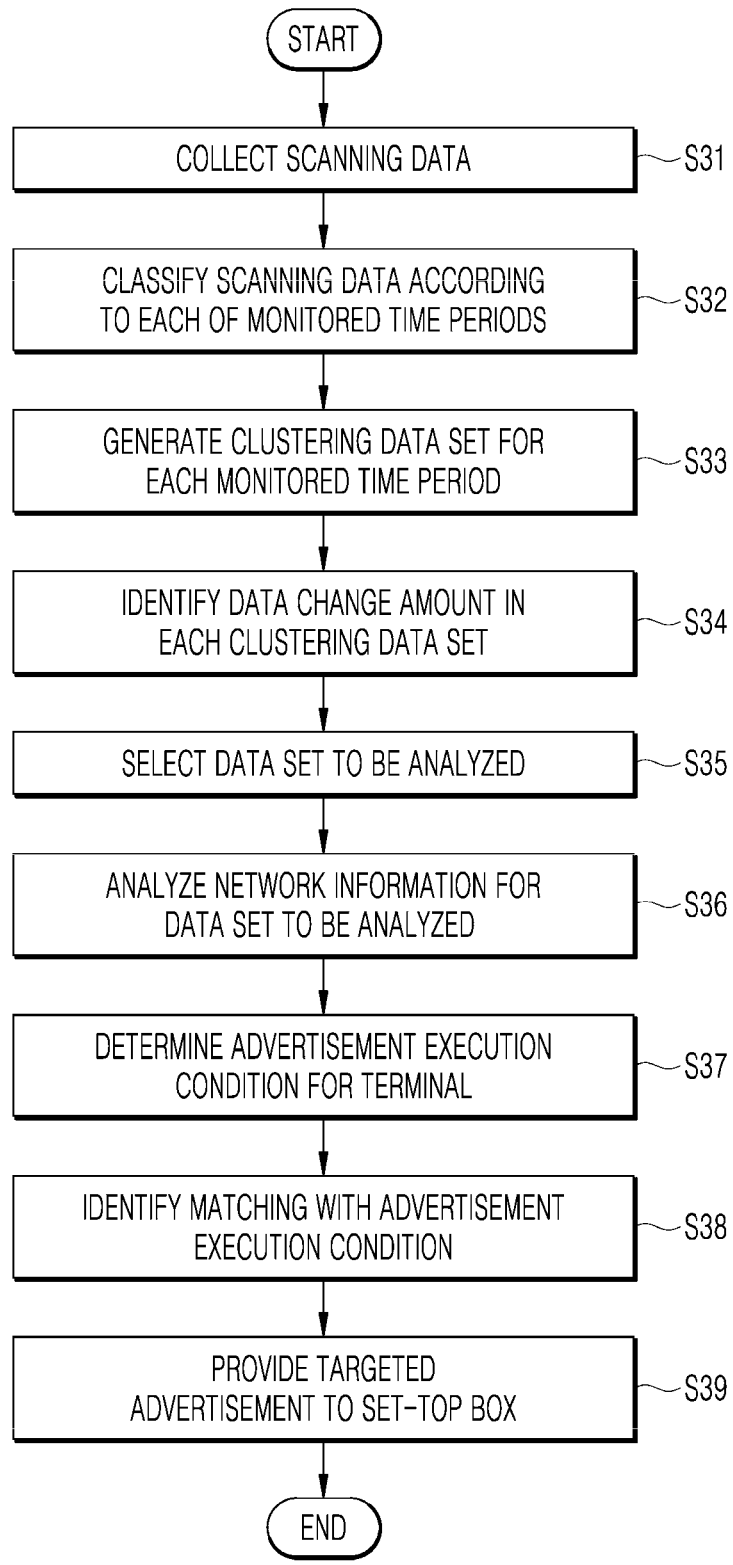
FIG. 4 is a flowchart schematically illustrating a method for operating the advertisement service device according to the first embodiment of the present disclosure.

Hereinafter, a method for operating the advertisement service device 30 according to the first embodiment of the present disclosure is described with reference to FIG. 4.

First, the generator 31 collects scanning data obtained by scanning the WLANs by the terminal 10, classifies the collected scanning data into data for each of the predefined monitored time periods, and generates a clustering data set for each monitored time period (S31 to S33).

The monitored time period is a time period on a specific day (for example, the weekend or a holiday) during which it is expected that the user of the terminal 10 is highly likely to be located in a specific place (for example, at home) in which the set-top box 20 is installed, and may be divided such that the overall time of the specific day is divided into time period units (day time/night time).

Meanwhile, in this connection, the terminal 10 scans neighboring WLANs according to a preset scanning period or a separate indication, generates scanning data at each scanning time point, and transmits the generated scanning data in real time to the advertisement service device 30 at every time point at which the scanning data is generated, or collectively transmits the generated scanning data to the advertisement service device 30 at a time point at which a predetermined amount of scanning data has been accumulated.

The scanning data may include a list of scanned WLANs, and items of the list may include, for example, a Basic Service Set Identifier (BSSID) for identifying a Basic Service Set (BSS), which is a basic service area of the WLAN, a Service Set Identifier (SSID), which is identification information for access between the terminal and an AP, a Received Signal Strength Indication (RSSI) from each WLAN, and the like.

When clustering data sets in each monitored time period is generated, the selector 32 selects a data set to be analyzed, which matches a specific place (for example, the home) in which the set-top box 20 is installed, from among the clustering data sets in every monitored time period on the basis of a data change amount identified for each of the clustering data sets (S34 to S35).

At this time, the selector 32 may select a clustering data set identified to have the smallest data change amount as the data set to be analyzed, among the clustering data sets in each monitored time period.

To this end, the selector 32 may compare WLAN lists within scanning data classified for each of the clustering data sets according to the scanning data, and identify a mismatch degree between the WLAN lists on the basis of the result of the comparison as the data change amount in the clustering data set.

The smallest data change amount in the clustering data set may mean that movement of the terminal 10 is minimal on a specific day (for example, the weekend or a holiday) on which it is expected that the user of the terminal 10 is highly likely to be located at a specific place (for example, the home) in which the set-top box 20 is installed, from which it may be construed that the user of the terminal 10 is most likely to be located at the specific place (for example, the home) in which the set-top box 20 is installed.

Accordingly, the selector 32 may select the clustering data set identified to have the smallest data change amount among the clustering data sets in each monitored time period as the data to be analyzed, which matches the specific place (for example, the home) in which the set-top box 20 is installed.

Thereafter, when the data to be analyzed, which matches the specific place (for example, the home) in which the set-top box 20 is installed, is selected, the determiner 33 analyzes network information in a monitored time period into which the corresponding data set has been classified, from the selected data set to be analyzed, and determines the analyzed network information as the advertisement execution condition of the terminal 10 for performing advertisement execution (S36 to S37).

At this time, the network information analyzed from the data to be analyzed may include a BSSID, which is identification information of a basic service area (BSS) having the largest scanning frequency in the monitored time period into which the data set to be analyzed has been classified, and the largest sum of received signal strengths (RSSIs) of each station.

The basic service area (BSS) having the largest scanning frequency in the monitored time period into which the data set to be analyzed has been classified, and the largest sum of received signal strengths (RSSIs) of each station, may be understood as a representative basic service area that can most exactly specify the specific place (for example, the home) in which the set-top box 20 is installed among a plurality of basic service areas that can be identified within the specific place (for example, the home) in which the set-top box 20 is installed.

To this end, the determiner 33 arranges WLANs included in the scanning data within the data set to be analyzed in descending order based on the received signal strength (RSSI), and applies a term frequency-inverse document frequency (TF-IDF) algorithm to identify a frequency of each BSSID from a list of the WLANs arranged in descending order.

Further, the determiner 33 classifies the result that has passed through the above process into separate rows, and determines the BSSID of the basic service area (BSS) analyzed to have the largest scanning frequency and the largest sum of received signal strengths (RSSIs) of stations as the advertisement execution condition of the terminal 10 for performing advertisement execution.

Meanwhile, in the first embodiment of the present disclosure, a case in which the WLAN of the specific place (for example, the home) includes, for example, dual channels of 2.4G and 5G, may be considered.

In this case, in the first embodiment of the present disclosure, through application of similarity between texts, different BSSIDs determined to have a similarity between texts of larger than or equal to a threshold value may be considered to be the same BSSIDs.

Thereafter, when network information that matches the advertisement execution condition is identified from the terminal 10 after the advertisement execution condition for the terminal 10 has been determined, the provider 34 provides the targeted advertisement for the terminal 10 to the set-top box 30 (S38 to S39).

At this time, when network information that matches the advertisement execution condition determined for the terminal 10 is identified from scanning data obtained through scanning by the terminal 10 in every preset scanning period, the provider 34 may provide the targeted advertisement for the terminal 10 to the set-top box 20 at a time point at which the corresponding network information is identified.

The identification of the network information that matches the advertisement execution condition determined for the terminal 10 from the scanning data obtained through scanning by the terminal 10 means that the terminal 10 has entered (is located at) specific place in which the set-top box 20 is installed (for example, the home.

Accordingly, in the first embodiment of the present disclosure, the targeted advertisement for the terminal 10 is provided only when entry (placement) of the terminal 10 into the specific place (for example, the home) in which the set-top box 20 is installed is identified, and thus improvement of an advertisement effect of the targeted advertisement may be expected.

As described above, according to the configuration of the advertisement service device 30 according to the first embodiment of the present disclosure, by determining the advertisement execution condition for the terminal 10 on the basis of scanning data obtained by scanning the WLAN (Wi-Fi) and providing the targeted advertisement to the set-top box 20 at the time point that matches the advertisement execution condition, it is possible to prevent the terminal 10 from excessively using resources, since the terminal does not require processes of accessing the WLAN and performing multicasting with the set-top box in order to provide an advertisement ID. In this connection, in the first embodiment of the present disclosure, the targeted advertisement for the terminal 10 is provided only when entry (placement) of the terminal 10 into the specific place (for example, the home) in which the set-top box 20 is installed is identified, and thus improvement of an advertisement effect of the targeted advertisement can be expected.

Hereinafter, a second embodiment of the present disclosure will be described with reference to the accompanying drawings.

In the second embodiment of the present disclosure, an addressable TV advertisement technology, which is state-of-the-art advertising technology capable of sending a targeted advertisement to homes, is described.

Recently, in an Internet Protocol Television (IPTV) service environment for providing a bi-directional information service that provides several hundreds of channels using a high-speed Internet network, commercialization of addressable TV advertisements is speeding up.

The addressable TV is a subordinate concept of a programmatic TV capable of performing TV advertisement purchase and transmission based on data, and refers to state-of-the-art advertisement technology that can transmit targeted advertisements to homes.

In this connection, the conventional TV advertisements have kept to a scheme in which an advertiser produces advertisements and makes a contract in unit of broadcasting programs through a program producer or a broadcasting business operator.

In other words, in the conventional TV advertisement environment, a broadcasting company purchases advertisements added to the front, back, and middle of a program unit and then transmits the same advertisements to TVs of the home at the same time, and accordingly all viewers view the same advertisements at the same time.

This is a scheme of exposing the advertisement to many and unspecified persons, which cannot be accurately targeted and thus has disadvantages in that large budget loss is generated, it is difficult to perform accurate measurement of the performance of an advertisement, and a ratio of redundancy may appear.

On the contrary, the addressable TV advertisement is a scheme in which an IPTV platform service provider rather than the broadcasting company provides advertisements to individuals, and the platform service provider may transmit a home-customized advertisement having high correlation through analysis of various pieces of data such as a viewing history, a family member, a gender, an age, a characteristic, and interest of each home and also transmit a customized advertisement in a real time channel.

As described above, since the targeted advertisement can be provided to an IPTV subscriber (hereinafter, referred to as a "terminal") in the home in the addressable TV advertisement environment, the targeted advertisement may have a higher advertisement effect than a conventional TV advertisement. If terminals identified in the home are divided into existing member terminals and visitor terminals, and the targeted advertisement can be provided thereto, a better advertisement effect can be expected.

Accordingly, a second embodiment of the present disclosure provides a scheme of dividing terminals identified in the home into a member terminal corresponding to a terminal possessed by a member of the home and a visitor terminal corresponding to a terminal possessed by a visitor to the home, and providing a targeted advertisement according thereto in the addressable TV advertisement environment.

Figure 5:
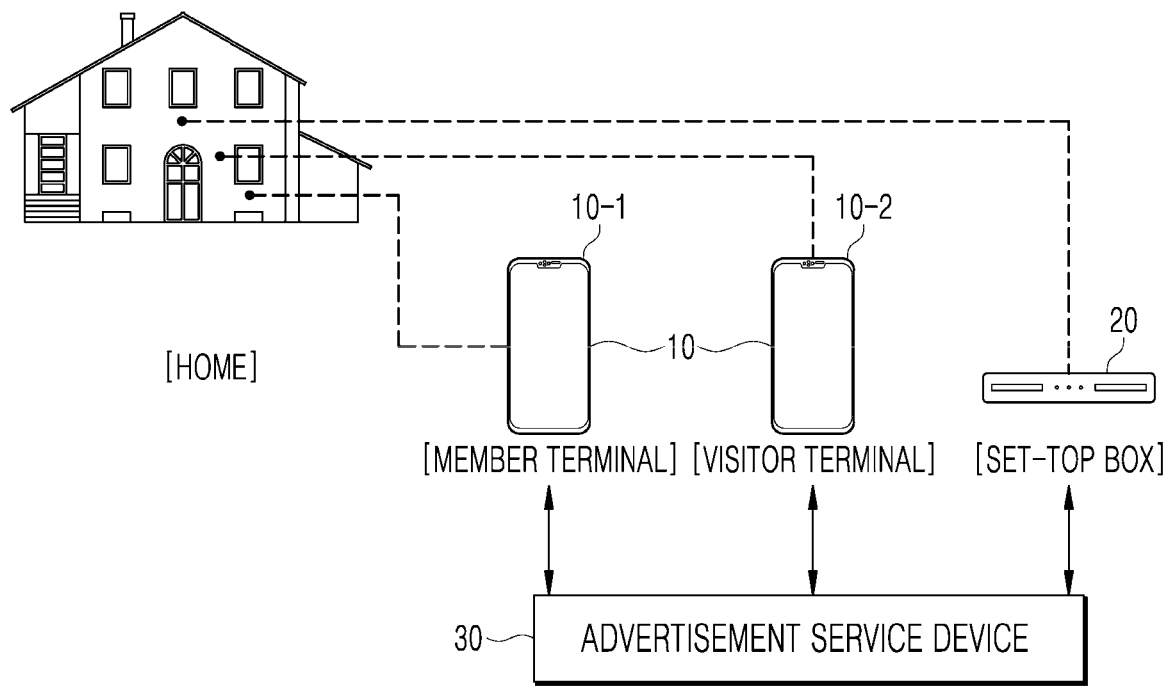
FIG. 5 illustrates an example of the addressable TV advertisement environment according to a second embodiment of the present disclosure.

In this connection, FIG. 5 illustrates an example of the addressable TV advertisement environment according to the second embodiment of the present disclosure.

As illustrated in FIG. 5, the addressable TV advertisement environment according to the second embodiment of the present disclosure may include an advertisement service device 60 for dividing terminals 40 identified in a home in which a set-top box 50 is installed into a member terminal 40-1 and a visitor terminal 40-2, and providing a targeted advertisement according thereto.

The terminals 40 refer to mobile devices which transmit WLAN detection data obtained by detecting a WLAN signal (for example, Wi-Fi) in the home to the advertisement service device 60.

The terminals 40 may be, for example, a smart phone, a portable terminal, a mobile terminal, a personal digital assistant (PDA), a portable multimedia player (PMP), a telematics terminal, a navigation terminal, a personal computer, a notebook computer, a slate PC, a tablet PC, an ultrabook, a wearable device, and the like, but is not limited thereto, and may include any device capable of scanning a WLAN through a GPS, Wi-Fi, Bluetooth, BLE, a sensor, Near Field Communication (NFC), and the like.

The set-top box 50 refers to a relay device installed to support an Internet Protocol Television (IPTV) service for a subscriber in the home, and may not only receive various pieces of content through a wireless router (not shown) but also provide a bi-directional service supported by the IPTV service.

The advertisement service device 60 refers to a device for dividing the terminals 40 identified in the home into the member terminal 40-1 corresponding to a terminal possessed by a member of the home and the visitor terminal 40-2 corresponding to a terminal possessed by a visitor to the home, and providing the targeted advertisement according thereto, and may be implemented, for example, in the form of a server.

When the advertisement service device 60 is implemented in the form of a server, the advertisement service device may be implemented in the form of, for example, a web server, a database server, a proxy server, or the like, and may be implemented as a computerized system through installation of one or more of various pieces of software that allow a network load distribution mechanism or the service device to operate over the Internet or another network.

At this time, the network may be an http network, a private line, an intranet, or any other network, and a connection between elements within an advertisement providing system according to the second embodiment of the present disclosure may be made through a security network to prevent data from being compromised by any hacker or other third party.

In the addressable TV advertisement environment according to the second embodiment of the present disclosure, the targeted advertisement may be provided to a combination of the member terminal 40-1 and the visitor terminal 40-2 of which the locations corresponding to the home are identified through the above-described configuration, and hereinafter, a configuration of the advertisement service device 60 for implementing the same is described in more detail.

Figure 6:
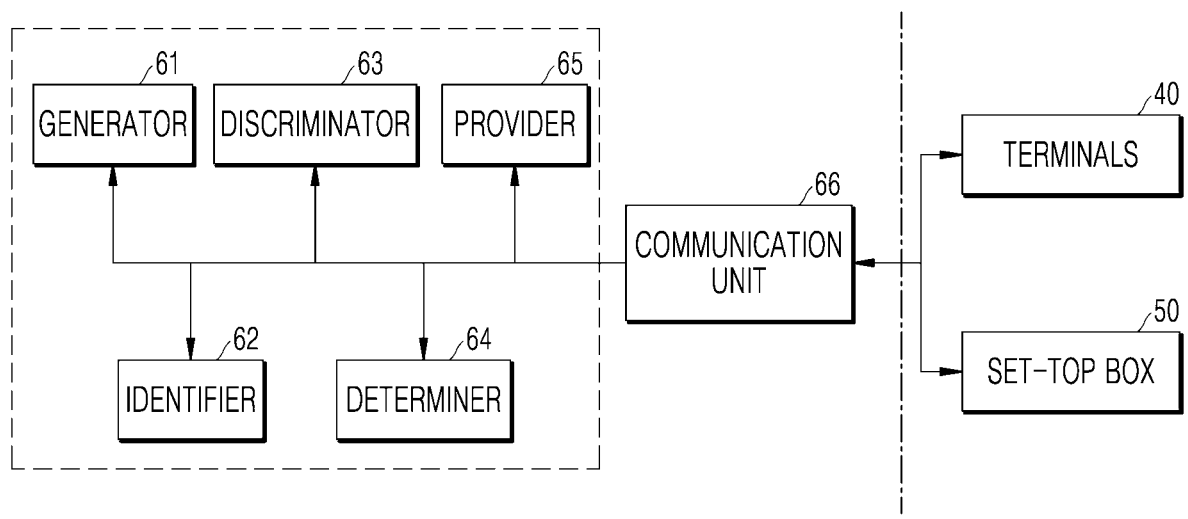
FIG. 6 is a block diagram schematically illustrating the advertisement service device according to the second embodiment of the present disclosure.

FIG. 6 schematically illustrating the configuration of the advertisement service device 60 according to the second embodiment of the present disclosure.

As illustrated in FIG. 6, the advertisement service device 60 according to the second embodiment of the present disclosure may have a configuration including a discriminator 63 for discriminating between the member terminal 40-1 and the visitor terminal 40-2, from among the terminals 40 located in the home, a determiner 64 for determining a familiarity degree between the member terminal 40-1 and the visitor terminal 40-2, and a provider 65 for providing the targeted advertisement.

The advertisement service device 60 according to the second embodiment of the present disclosure may have a configuration further including a generator 61 for generating a fingerprint for a WLAN signal detected in the home, and an identifier 62 for identifying the terminals 40 located in the home, in addition to the above-described elements.

All or at least some of the elements of the advertisement service device 60, including the generator 61, the identifier 62, the discriminator 63, the determiner 64, and the provider 65, may be implemented in the form of a software module executed by a processor, in the form of a hardware module, or in the form of a combination of a software module and a hardware module.

Meanwhile, in addition to the above-described elements, the advertisement service device 60 according to the second embodiment of the present disclosure may have a configuration further including a communication unit 66, which is a communication module for performing an actual communication function with the terminals 40 and the set-top box 50.

For reference, the communication unit 66 is an element that corresponds to a communication unit 6310 described with reference to FIG. 7 below, and thus a detailed description thereof is made below.

As a result, the advertisement service device 60 according to the second embodiment of the present disclosure may divide the terminals 40 of which the locations are identified in the home into the member terminal 40-1 and the visitor terminal 40-2, and provide the targeted advertisement according thereto through the above-described configuration, and hereinafter, each element of the advertisement service device 60 for implementing the same is described in detail.

The generator 61 generates a fingerprint for a wireless signal detected in the home.

More specifically, the generator 61 collects WLAN detection data obtained by detecting a WLAN signal by the set-top box 50 installed in the home from the set-top box 50, and generates a fingerprint for the WLAN signal detected in the home on the basis of the collected WLAN detection data.

At this time, the generator 61 may configure a data window by accumulating WLAN detection data collected from the set-top box 50 during, for example, several days, derive a characteristic of the WLAN detection data according to the location of the set-top box 50 in the home from the data window, and generate a fingerprint in which the derived characteristic is reflected.

The WLAN detection data may include, for example, detection location information of the detected WLAN signal, WLAN name information (Service Set Identifier (SSID)), WLAN address information (Basic Service Set Identifier (BSSID)), a number of detections of WLAN signals, and a Received Signal Strength Indication (RSSI) of a WLAN signal.

The identifier 62 performs a function of identifying the terminals 40 located in the home.

More specifically, when the fingerprint for the WLAN signal in the home is generated, the identifier 62 identifies that the terminals 40 are located in the home on the basis of the WLAN detection data received from the respective terminals 40.

At this time, the identifier 62 may identify the terminals 40 located in the home by identifying a pre-generated fingerprint for a WLAN signal detected in the home on the basis of the WLAN detection data received from the respective terminals 40.

Meanwhile, in this connection, the terminals 40 generate WLAN detection data obtained by detecting neighboring WLAN signals (for example, Wi-Fi) and transmit the generated WLAN detection data to the advertisement service device 60.

At this time, the terminals 40 may detect the neighboring WLAN signals according to a preset WLAN detection period or a separate indication and generate WLAN detection data.

Accordingly, the identifier 62 may configure a WLAN detection period for the terminals 40 or transmit an indication separated from the configured WLAN detection period to the terminals 40 so as to control a frequency of the operation of detecting the WLAN signal performed by the terminals 40.

The discriminator 63 performs a function of discriminating between the member terminal 40-1 and the visitor terminal 40-2.

More specifically, the discriminator 63 discriminates between the member terminal 40-1 corresponding to a terminal possessed by a member of the home and the visitor terminal 40-2 corresponding to a terminal possessed by a visitor to the home, from among the terminals 40 of which the locations are identified in the home.

At this time, the discriminator 63 may estimate a main activity area of each terminal 40 located in the home, and discriminate between the member terminal 40-1 and the visitor terminal 40-2 according to the result of the estimation of the main activity area.

In this connection, the discriminator 63 may estimate the main activity area of each terminal on the basis of WLAN detection data obtained by detecting a WLAN signal for each time period by each terminal 40 of which the location is identified in the home.

More specifically, the discriminator 63 may select WLAN detection data having the highest frequency of detection of the same WLAN signal at each time, and calculate a value of the location of each terminal 40 corresponding to a time point at which WLAN detection data having the highest frequency of detection was generated (detected), using true-range multilateration of the WLAN signal within the selected WLAN detection data.

Further, when the value of the location of each terminal 40 is calculated from the selected WLAN detection data, the discriminator 63 may estimate, as the main activity area of each terminal 40 for each time period, a point at which values of the locations of each terminal 40 intersect on polygon data published by the Ministry of Land, Infrastructure and Transport regarding locations of individual buildings and aggregate buildings.

For reference, when the point at which the values of the locations calculated for the respective terminals 40 intersect on the polygon data is an aggregate building such as an apartment or a residential area, the corresponding point may be estimated as a main activity area and a residence (the home) of the user.

When the intersection point is an individual building such as an office, the corresponding point may be estimated as a main activity area and an office of the user of the terminal 40.

As a result, when the main activity area of each terminal 50 identified in the home is estimated, according to the estimated result, the discriminator 63 may discriminate between the member terminal 40-1 having the home as the main activity area and the visitor terminal 40-2 having a place other the home as the main activity area, among the terminals 40 identified in the home.

The determiner 64 performs a function of determining a familiarity degree between the member terminal 40-1 and the visitor terminal 40-2.

More specifically, when the member terminal 40-1 and the visitor terminal 40-2 have been discriminated among the terminals 40 of which the locations are identified in the home, the determiner 64 determines the familiarity degree between the identifier member terminal 40-1 and visitor terminal 40-2.

At this time, prior to performing the operation of determining the familiarity degree, the determiner 64 first verifies the validity of the operation of determining the familiarity degree, and when the validity is verified, performs the operation of determining the familiarity degree between the member terminal 40-1 and the visitor terminal 40-2.

The validity of the operation of determining the familiarity degree may be verified using a number of simultaneous appearances, which corresponds to the number of times that locations of the member terminal 40-1 and the visitor terminal 40-2 are identified at the same time.

In this connection, the determiner 64 may determine the familiarity degree between the member terminal 40-1 and the visitor terminal 40-2 only when the number of simultaneous appearances, which corresponds to the number of times that the locations of the member terminal 40-1 and the visitor terminal 40-2 have been identified at the same time in at least one of the home or another place excluding the home, is larger than or equal to a threshold number.

As such, the verification of the validity of the operation of determining the familiarity degree is in consideration of the waste of resources due to unnecessary familiarity degree determinations in cases where the familiarity degree between the member terminal 40-1 and the visitor terminal 40-2 is determined even though the correlation therebetween determined on the basis of the number of simultaneous appearances is low (the number of simultaneous appearances is smaller than the threshold number).

When the validity of the operation of determining the familiarity degree has been verified, the determiner 64 determines the familiarity degree between the member terminal 40-1 and the visitor terminal 40-2 on the basis of at least one of a number of visits to the home, corresponding to the number of times the visitor terminal 40-2 has visited the home, or a simultaneous stay time, corresponding to a time during which the visitor terminal 40-2 stayed in the home with the member terminal 40-1 when the visitor terminal 40-2 visited the home.

At this time, the determiner 64 may assign a basic familiarity score to each of the number of visits to the home and the simultaneous stay time, and apply weighted values considering the number of visits to the home and the simultaneous stay time for the basic familiarity score, so as to determine the familiarity degree between the member terminal 40-1 and the visitor terminal 40-2 in the form of a score.

A higher score may be assigned as the number of visits to the home of the basic familiarity score is larger or the simultaneous stay time is longer. Different weighted values considering the number of visits to the home and the simultaneous stay time may be applied to the basic familiarity score of the number of visits to the home and the basic familiarity score of the simultaneous stay time, on the basis of common context information between the member terminal 40-1 and the visitor terminal 40-2.

For example, when common context information between the member terminal 40-1 and the visitor terminal 40-2 is "mother with child", a larger weighted value may be applied to the simultaneous stay time than the number of visits to the home. When the common context is "high school student", a larger weighted value may be applied to the number of visits to the home than the simultaneous stay time.

Meanwhile, the second embodiment of the present disclosure considers the case in which the number of at least one of the member terminal 40-1 or the visitor terminal 40-2 discriminated from the terminals 40 located in the home is two or more.

That is, when the number of at least one of the member terminal 40-1 or the visitor terminal 40-2 discriminated from the terminals 40 located in the home is two or more, the determiner 64 configures terminal combinations in which the member terminals 40-1 and the visitor terminals 40-2 are matched differently, and determines the familiarity degree according to each terminal combination.

As such, determination of a priority of the familiarity degree for each terminal combination may be understood as being for providing a targeted advertisement for each terminal combination according to the determined familiarity degree priority.

The provider 65 performs a function of providing a targeted advertisement.

More specifically, the provider 65 selects and provides a targeted advertisement for a combination of the member terminal 40-1 and the visitor terminal 40-2 according to the result of determination of the familiarity degree between the member terminal 40-1 and the visitor terminal 40-2.

At this time, when the determined familiarity degree between the member terminal 40-1 and the visitor terminal 40-2 is larger than or equal to a threshold value, the provider 65 may select and provide a targeted advertisement for a combination of the member terminal 40-1 and the visitor terminal 40-2 according to the result of an association analysis of the context information of each of the member terminal 40-1 and the visitor terminal 40-2.

For example, the provider 65 may select and provide a targeted advertisement on the basis of common context information between the member terminal 40-1 and the visitor terminal 40-2 according to the result of the association analysis of the context information of each of the member terminal 40-1 and the visitor terminal 40-2.

Meanwhile, when a familiarity degree is determined for each terminal combination in which the member terminals 40-1 and the visitor terminals 40-2 in the home are matched differently, the provider 65 may select and provide a targeted advertisement with reference to the result of the association analysis of the context information for each terminal combination, based on the familiarity degree priority.

For reference, the targeted advertisement selected for the member terminal 40-1 and the visitor terminal 40-2 may be provided to, for example, the set-top box 50 in the home, or provided to the member terminal 40-1.

It has been described above that each element of the advertisement service device 60 may be implemented in the form of a software module executed by a processor, in the form of a hardware module, or in the form of a combination of a software module and a hardware module.

As described above, the software module executed by the processor, the hardware module, and the combination of the software module and the hardware module may be implemented by an actual hardware system (for example, a computer system).

Accordingly, hereinafter, a hardware system 6000, obtained by implementing the advertisement service device 60 in a hardware form according to the second embodiment of the present disclosure, is described with reference to FIG. 7.

For reference, the following description is an example of the hardware system 6000 in which each element of the advertisement service device 60 is implemented, and it should be noted that each element and the operation thereof may be different from those of an actual system.

Figure 7:
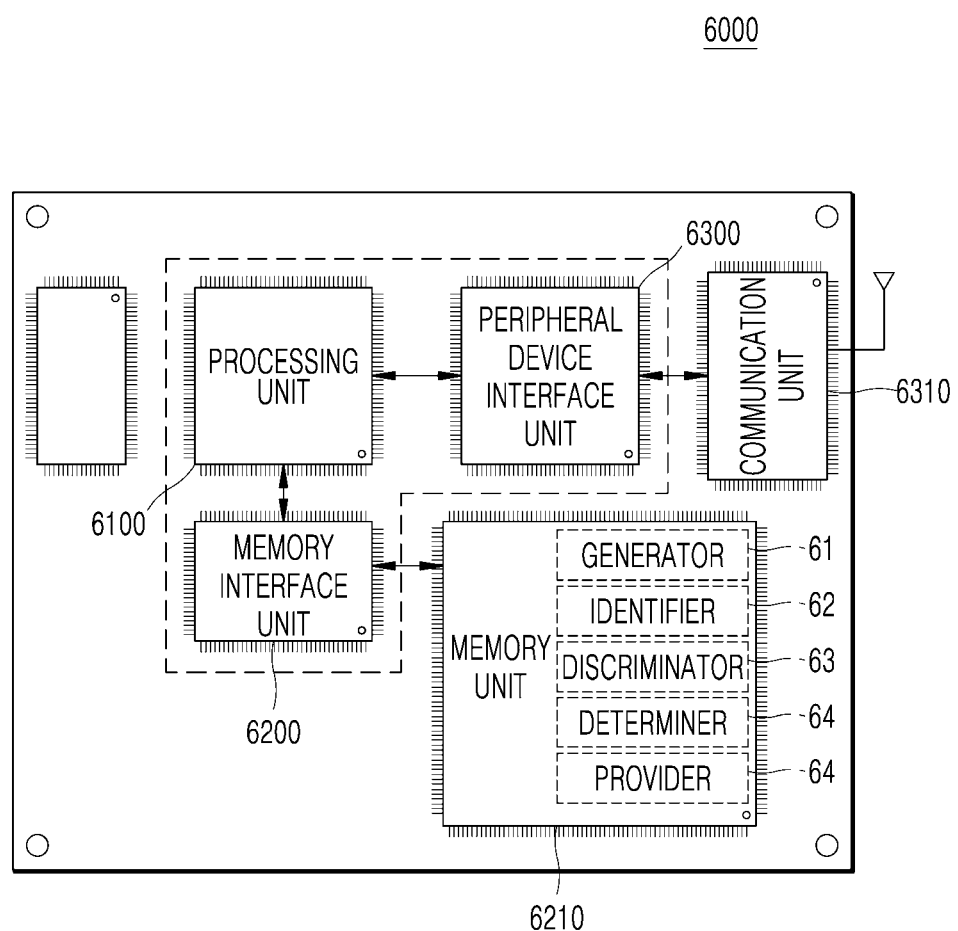
FIG. 7 illustrates an example of a hardware system for implementing the advertisement service device according to the second embodiment of the present disclosure.

As illustrated in FIG. 7, the hardware system 6000 according to the second embodiment of the present disclosure may have a configuration including a processing unit 6100, a memory interface unit 6200, and a peripheral device interface unit 6300.

The respective elements of the hardware system 6000 may be individual elements, or may be integrated into one or more integrated circuits, and may be combined by a bus system (not shown).

The bus system is an abstraction indicating one or more individual physical buses, communication lines/interfaces, and/or multi-drop or point-to-point connections connected by bridges, adaptors, and/or controllers as appropriate.

The processing unit 6100 may serve to execute various software modules stored in the memory unit 6210 by communicating with the memory unit 6210 through the memory interface unit 6200 in order to perform various functions in the hardware system.

The memory unit 6210 may store the generator 61, the identifier 62, the discriminator 63, the determiner 64, and the provider 65, which are the elements of the advertisement service device 60 described with reference to FIG. 6, in the form of a software module, and may further store an operating system (OS).

The operating system (for example, an embedded operating system such as iOS, Android, Darwin, RTXC, LINUX, UNIX, OS X, WINDOWS, or VxWorks) includes various procedures, an instruction set, a software component, and/or a driver for controlling and managing general system tasks (for example, memory management, storage device control, power management, and the like), and serves to facilitate communication between various hardware modules and software modules.

For reference, the memory 6210 includes a cache, a main memory, and a secondary memory, but is not limited thereto, and may include a memory layer structure. The memory layer structure may be implemented through a predetermined combination of, for example, RAM (for example, SRAM, DRAM, or DDRAM), ROM, FLASH, a magnetic and/or optical storage device (for example, a disk drive, a magnetic tape, a compact disk (CD), and a digital video disc (DVD)).

The peripheral interface unit 6300 serves to enable communication between the processing unit 6100 and peripheral devices.

The peripheral devices are to provide different functions to the hardware system 300 and may include, for example, the communication unit 3310 in the second embodiment of the present disclosure.

The communication unit 6310 serves to provide a function of communication with another device. To this end, the communication unit 6310 may include, for example, an antenna system, an RF transceiver, one or more amplifiers, a tuner, one or more oscillators, a digital signal processor, a CODEC chipset, and a memory, but is not limited thereto, and may include a known circuit for performing the function.

Communication protocols supported by the communication unit 6310 may include, for example, a wireless LAN (WLAN), Digital Living Network Alliance (DLNA), Wireless broadband (Wibro), World interoperability for microwave access (Wimax), Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), IEEE 802.16, Long Term Evolution (LTE), Long Term Evolution-Advanced (LTE-A), Wireless Mobile Broadband Service (WMBS), Bluetooth, Radio Frequency Identification (RFID), Infrared Data Association (IrDA), Ultra-Wideband (UWB), ZigBee, Near Field Communication (NFC), Ultra Sound Communication (USC), Visible Light Communication (VLC), Wi-Fi, and Wi-Fi Direct. Wired communication networks may include wired Local Area Network (LAN), wired Wide Area Network (WAN), Power Line Communication (PLC), USB communication, Ethernet, serial communication, and optical fiber/coaxial cable, but are not limited thereto, and may include any protocol that can provide a communication environment with another device.

In the hardware system 6000 according to the second embodiment of the present disclosure, through the respective elements of the advertisement service device 60 stored in the memory unit 6210 in the form of a software module, an interface with the communication unit 6310 via the memory interface unit 6200 and the peripheral device interface unit 6300 in the form of instructions executed by the processing unit 6100 may be executed, and thus the advertisement service device 60 may divide the terminals 40 identified in the home into the member terminal 40-1 and the visitor terminal 40-2, and provide a targeted advertisement for a combination of the divided member terminal 40-1 and visitor terminal 40-2 through the above-described configuration.

As described above, according to the configuration of the advertisement service device 60 according to the second embodiment of the present disclosure, it is possible to improve a targeting effect of an advertisement by providing a targeted advertisement according to familiarity degree determined for a combination of member terminals and visitor terminals located in the home in the addressable TV advertisement environment.

Figure 8:
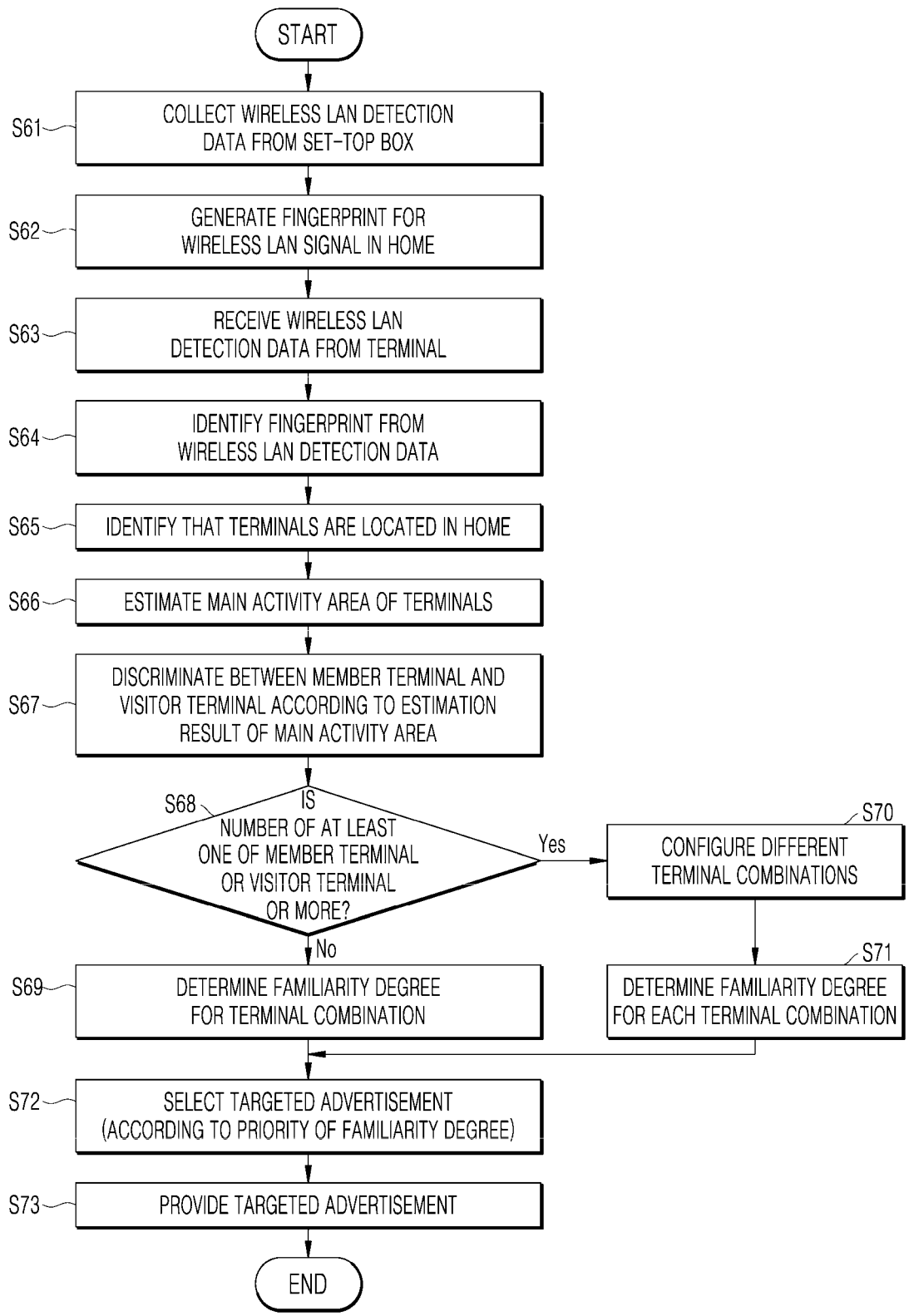
FIG. 8 is a flowchart schematically illustrating the method for operating the advertisement service device according to the second embodiment of the present disclosure.

Hereinafter, a method for operating the advertisement service device 60 according to the second embodiment of the present disclosure is described with reference to FIG. 8.

First, the generator 61 collects WLAN detection data obtained by detecting a WLAN signal by the set-top box 50 installed in the home from the set-top box 50, and generates a fingerprint for the WLAN signal detected in the home on the basis of the collected WLAN detection data (S61 to S62).

At this time, the generator 61 may configure a data window by accumulating WLAN detection data collected from the set-top box 50 in the home during, for example, several days, derive a characteristic of the WLAN detection data according to the location of the set-top box 50 in the home from the data window, and generate a fingerprint in which the derived characteristic is reflected.

The WLAN detection data may include, for example, detection location information of the detected WLAN signal, WLAN name information (Service Set Identifier (SSID)), WLAN address information (Basic Service Set Identifier (BSSID)), a number of detections of WLAN signals, and a Received Signal Strength Indication (RSSI) of a WLAN signal.

When the fingerprint for the WLAN signal in the home is generated, the identifier 62 identifies that the terminals are located in the home on the basis of the WLAN detection data received from the respective terminals 40 (S63 to S64).

At this time, the identifier 62 may identify the terminals 40 located in the home by identifying a pre-generated fingerprint for a WLAN signal detected in the home on the basis of the WLAN detection data received from the respective terminals 40.

Meanwhile, in this connection, the terminals 40 generate WLAN detection data obtained by detecting neighboring WLAN signals (for example, Wi-Fi) and transmit the generated WLAN detection data to the advertisement service device 60.

At this time, the terminals 40 may detect the neighboring WLAN signals according to a preset WLAN detection period or a separate indication and generate WLAN detection data.

In this connection, the identifier 62 may configure a WLAN detection period for the terminals 40 or transmit an indication separated from the configured WLAN detection period to the terminals 40 so as to control a frequency of the operation of detecting the WLAN signal performed by the terminals 40.

Then, the discriminator 63 discriminates between the member terminal 40-1 corresponding to a terminal possessed by a member of the home and the visitor terminal 40-2 corresponding to a terminal possessed by a visitor to the home, from among the terminals 40 of which the locations are identified in the home (S66 to S67).

At this time, the discriminator 63 may estimate a main activity area of each terminal 40 located in the home and discriminate between the member terminal 40-1 and the visitor terminal 40-2 according to the result of the estimation of the main activity area.

In this connection, the discriminator 63 may estimate the main activity area of each terminal on the basis of WLAN detection data obtained by detecting a WLAN signal for each time period by each terminal 40 of which the location is identified in the home.

More specifically, the discriminator 63 may select WLAN detection data having the highest frequency of detection of the same WLAN signal at each time, and calculate a value of the location of each terminal 40 corresponding to a time point at which WLAN detection data having the highest frequency of detection was generated (detected), using true-range multilateration of the WLAN signal within the selected WLAN detection data.

Further, when the value of the location of each terminal 40 is calculated from the selected WLAN detection data, the discriminator 63 may estimate, as the main activity area of each terminal 40 for each time period, a point at which values of the locations of each terminal 40 intersect on polygon data published by the Ministry of Land, Infrastructure and Transport regarding locations of individual buildings and aggregate buildings.

For reference, when the point at which the values of the locations calculated for the respective terminals 40 intersect on the polygon data is an aggregate building such as an apartment or a residential area, the corresponding point may be estimated as a main activity area and a residence (the home) of the user.

When the intersection point is an individual building such as an office, the corresponding point may be estimated as a main activity area and an office of the user of the terminal 40.

As a result, when the main activity area of each terminal 50 identified in the home is estimated, according to the estimated result, the discriminator 63 may discriminate between the member terminal 40-1 having the home as the main activity area and the visitor terminal 40-2 having a place other the home as the main activity area, among the terminals 40 identified in the home.

Thereafter, when the member terminal 40-1 and the visitor terminal 40-2 are identified from the terminals 40 of which the locations are identified in the home, the determiner 64 determines the familiarity degree between the identified member terminal 40-1 and visitor terminal 40-2 (S68 to S69).

At this time, prior to performing the operation of determining the familiarity degree, the determiner 64 first verifies the validity of the operation of determining the familiarity degree, and when the validity is verified, performs the operation of determining the familiarity degree between the member terminal 40-1 and the visitor terminal 40-2.

The validity of the operation of determining the familiarity degree may be verified using a number of simultaneous appearances, which corresponds to the number of times that locations of the member terminal 40-1 and the visitor terminal 40-2 are identified at the same time.

In this connection, the determiner 64 may determine the familiarity degree between the member terminal 40-1 and the visitor terminal 40-2 only when the number of simultaneous appearances, which corresponds to the number of times that the locations of the member terminal 40-1 and the visitor terminal 40-2 have been identified at the same time in at least one of the home or another place excluding the home, is larger than or equal to a threshold number.

As the operation of determining the familiarity degree is in consideration of the waste of resources due to unnecessary familiarity degree determinations in cases where the familiarity degree between the member terminal 40-1 and the visitor terminal 40-2 is determined even though the correlation therebetween determined on the basis of the number of simultaneous appearances is low (the number of simultaneous appearances is smaller than the threshold number).

When the validity of the operation of determining the familiarity degree has been verified, the determiner 64 determines the familiarity degree between the member terminal 40-1 and the visitor terminal 40-2 on the basis of at least one of a number of visits to the home, corresponding to the number of times the visitor terminal 40-2 has visited the home, or a simultaneous stay time, corresponding to a time during which the visitor terminal 40-2 stayed in the home with the member terminal 40-1 when the visitor terminal 40-2 visited the home.

At this time, the determiner 64 may assign a basic familiarity score to each of the number of visits to the home and the simultaneous stay time, and apply weighted values considering the number of visits to the home and the simultaneous stay time for the basic familiarity score, so as to determine the familiarity degree between the member terminal 40-1 and the visitor terminal 40-2 in the form of a score.

A higher score may be assigned as the number of visits to the home of the basic familiarity score is larger or the simultaneous stay time is longer. Different weighted values considering the number of visits to the home and the simultaneous stay time may be applied to the basic familiarity score of the number of visits to the home and the basic familiarity score of the simultaneous stay time, on the basis of common context information between the member terminal 40-1 and the visitor terminal 40-2.

For example, when common context information between the member terminal 40-1 and the visitor terminal 40-2 is "mother with child", a larger weighted value may be applied to the simultaneous stay time than the number of visits to the home. When the common context is "high school student", a larger weighted value may be applied to the number of visits to the home than the simultaneous stay time.

Meanwhile, the second embodiment of the present disclosure considers the case in which the number of at least one of the member terminal 40-1 or the visitor terminal 40-2 discriminated from the terminals 40 located in the home is two or more.

That is, when the number of at least one of the member terminal 40-1 or the visitor terminal 40-2 discriminated from among the terminals 40 located in the home is two or more, the determiner 64 configures terminal combinations in which the member terminals 40-1 and the visitor terminals 40-2 are matched differently, and determines the familiarity degree according to each terminal combination (S70 to S71).

As such, determination of a priority of the familiarity degree for each terminal combination may be understood as being for providing a targeted advertisement for each terminal combination according to the determined familiarity degree priority.

Thereafter, the provider 65 selects and provides a targeted advertisement for a combination of the member terminal 40-1 and the visitor terminal 40-2 according to the result of determination of the familiarity degree between the member terminal 40-1 and the visitor terminal 40-2 (S72 to S73).

At this time, when the determined familiarity degree between the member terminal 40-1 and the visitor terminal 40-2 is larger than or equal to a threshold value, the provider 65 may select and provide a targeted advertisement for a combination of the member terminal 40-1 and the visitor terminal 40-2 according to the result of an association analysis of the context information of each of the member terminal 40-1 and the visitor terminal 40-2.

For example, the provider 65 may select and provide a targeted advertisement on the basis of common context information between the member terminal 40-1 and the visitor terminal 40-2 according to the result of the association analysis of the context information of each of the member terminal 40-1 and the visitor terminal 40-2.

Meanwhile, when a familiarity degree is determined for each terminal combination in which the member terminal 40-1 and the visitor terminal 40-2 in the home are matched differently, the provider 65 may select and provide a targeted advertisement with reference to the result of the association analysis of the context information for each terminal combination, based on the familiarity degree priority.

For reference, the targeted advertisement selected for the member terminal 40-1 and the visitor terminal 40-2 may be provided to, for example, the set-top box 50 in the home, or provided to the member terminal 40-1.

As described above, according to the method for operating the advertisement service device 60 according to the second embodiment of the present disclosure, it is possible to improve a targeting effect of an advertisement by providing a targeted advertisement according to familiarity degree determined for a combination of member terminals and visitor terminals located in the home in the addressable TV advertisement environment.

The implementations of the functional operations and subject matter described in the present disclosure can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible program carrier for execution by, or to control the operation of, a processing system.

A computer-readable medium may be a machine-readable storage device, a machine-readable storage substrate, a memory device, a composition of matter effecting a machine-readable propagated signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification are not intended to limit the present disclosure. Therefore, although the present invention has been described with reference to the described examples, those skilled in the field may reconstruct, change, and modify the examples, without departing from the scope of the present invention. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A device for selectively presenting information to users, the device comprising:
   one or more processors; and
   a memory storing instructions thereon, the instructions when executed by the one or more processors cause the one or more processors to:
   receive first scanning data from a terminal of a user, the scanning data comprising a list of wireless location area networks (WLANs) scanned by the terminal of the user;
   classify the first scanning data received from the terminal for each of monitored time periods to generate clustering data sets for monitored time periods;
   select, from the clustering data sets, a clustering data set having a smallest amount of data change as being associated with a place in which a set-top box is installed by at least:
   compare WLAN lists within the scanning data related to each of the clustering data sets, and
   identify a degree of mismatch in the WLAN lists according to a result of the comparison as the amount of data change for each of the data clustering sets;
   set first network information of a monitored time period corresponding to the selected clustering data set as a condition for presenting the information to the user, the first network information associated with a first frequency band channel;
   determine that the first network information and second network information match responsive to a text of the first network information and a text of the second network information having a similarity larger than or equal to a threshold value, the second network information in second scanning data received from the terminal and associated with a second frequency band channel; and
   cause the set-top box to present the information to the user via the terminal responsive to the second network information in second scanning data received from the terminal matching the first network information.

2. The device of claim 1, wherein causing the set-top box to present the information to the user comprises sending the information for the terminal to the set-top box.

3. The device of claim 1, wherein the first network information or the second network information includes at least a Basic Service Set Identifier (BSSID).

4. A method for selectively presenting information to users, the method comprising:

receiving first scanning data from a terminal of a user, the scanning data comprising a list of wireless location area networks (WLANs) scanned by the terminal of the user;

classifying the first scanning data received from the terminal for each of monitored time periods to generate clustering data sets for monitored time periods;

selecting, from the clustering data sets, a clustering data set having a smallest amount of data change as being associated with a place in which a set-top box is installed by at least:
- comparing WLAN lists within the scanning data related to each of the clustering data sets, and
- identifying a degree of mismatch in the WLAN lists according to a result of the comparison as the amount of data change for each of the data clustering sets;

setting first network information of a monitored time period corresponding to the selected clustering data as a condition for presenting the information to the user, the first network information associated with a first frequency band channel;

determining that the first network information and second network information match responsive to a text of the first network information and a text of the second network information having a similarity larger than or equal to a threshold value, the second network information in second scanning data received from the terminal and associated with a second frequency band channel; and causing the set-top box to present the information to the user via the terminal responsive to the second network information in second scanning data received from the terminal matching the first network information.

5. The method of claim 4, wherein causing the set-top box to present the information to the user comprises sending a targeted advertisement for the terminal to the set-top box.

6. The method of claim 4, wherein each of the first network information or the second network information includes a BSSID, which is identification information of a Basic Service Set (BSS).

\* \* \* \* \*